US012795168B2

(12) United States Patent
Chen

(10) Patent No.: US 12,795,168 B2
(45) Date of Patent: Nov. 10, 2026

(54) METHODS AND SYSTEMS FOR DISPLAYING A MEDIA CONTENT ITEM

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 328 days.

(21) Appl. No.: 17/898,928

(22) Filed: Aug. 30, 2022

(65) Prior Publication Data

US 2024/0073455 A1 Feb. 29, 2024

(51) Int. Cl.
*H04N 19/66* (2014.01)
*H04N 19/174* (2014.01)
*H04N 21/4402* (2011.01)

(52) U.S. Cl.
CPC ........... *H04N 19/66* (2014.11); *H04N 19/174* (2014.11); *H04N 21/440272* (2013.01)

(58) Field of Classification Search
CPC ................. H04N 19/66; H04N 19/174; H04N 21/440272
USPC ..................................................... 375/240.12
See application file for complete search history.

(56) References Cited

U.S. PATENT DOCUMENTS

2019/0208281 A1* 7/2019 Niebres ............ H04N 21/42202
2020/0007921 A1* 1/2020 Ojala ................. H04N 21/4345
2020/0296317 A1* 9/2020 Post, Jr. ............... H04N 7/0122
2022/0272378 A1* 8/2022 Samuelsson ......... H04N 19/117

OTHER PUBLICATIONS

A VP9 Bitstream Overview draft-grange-vp9-bitstream-00 https://datatracker.ietf.org/doc/draft-grange-vp9-bitstream/ retrieved from internet Apr. 17, 2023.
Chen, et al., "An overview of coding tools in AV1: the first video codec from the alliance for open media", APSIPA Transactions on Signal and Information Processing, 9(6): 1-15 (2018).
https://www.thinkwithgoogle.com/consumer-insights/consumer-trends/mobile-video-viewing-behavior/ retrieved from the internet Apr. 13, 2023.
McDaniel, "Netflix could bring it's 'Fast Laughs' short-form video feature to Apple TV," https://9to5mac.com/2022/02/22/netflix-could-bring-short-form-video-fast-laughs-to-apple-tv/ pp. 1-4 (2022) retrieved from internet Apr. 13, 2023.
Mehvish, "5 Best Apps to Convert Landscape Videos to Portrait and Vice Versa," https://techwiser.com/apps-convert-landscape-video-portrait-vice-versa/ pp. 1-23 (2021) retrieved from internet Apr. 13, 2023.
MPEG-4, Advanced Video Coding (Part 10) (H.264), H.264: Advanced video coding for generic audiovisual services (itu.int), https://www.itu.int/rec/T-REC-H.264-202108-1 retrieved from internet Apr. 13, 2023.

(Continued)

*Primary Examiner* — Christopher S Kelley
*Assistant Examiner* — Ana Picon-Feliciano
(74) *Attorney, Agent, or Firm* — HG LAW LLP

(57) ABSTRACT

Systems and methods are described for encoding and displaying a media content item. An encoded media content item having a partitioning structure is generated. The partitioning structure comprises multiple partitioned areas configured to, when decoded, generate display of the media content item in a first format, and a partition boundary defining one of the partitioned areas configured to, when decoded, generate display of the media content item in a second format.

16 Claims, 11 Drawing Sheets

(56) References Cited

OTHER PUBLICATIONS

MPEG-H Part 2, High Efficiency Video Coding H.265: High efficiency video coding (itu.int), https://www.itu.int/rec/T-REC-H.265-202108-I retrieved from internet Apr. 13, 2023.
Ozer, "Bitmovin Video Developer Report Reports on Codec Usage," https://streaminglearningcenter.com/encoding/bitmovin-video-developer-report-reports-on-codec-usage.html pp. 1-4 (2022) retrieved from internet Apr. 13, 2023.
Wankhede, "What are video codecs? Everything you need to know about AV1, VP9, H.264, others" https://www.androidauthority.com/what-are-video-codecs-3066257/ pp. 1-28 (2022) retrieved from internet Apr. 13, 2023.
Wilbert, "Video Transcoding: The Best Video Bitrates for Mobile Streaming [2022 Update]," https://www.dacast.com/blog/video-transcoding-service-mobile-bitrate/ pp. 1-18 (2022) retrieved from internet Apr. 13, 2022.
Zoe, "Top 3 Methods to Convert Landscape," https://moviemaker.minitool.com/moviemaker/convert-landscape-video-to-portrait.html pp. 1-6 (2022) retrieved from internet Apr. 13, 2023.

* cited by examiner

METHODS AND SYSTEMS FOR DISPLAYING A MEDIA CONTENT ITEM

BACKGROUND

The present disclosure relates to methods and systems for decoding and displaying a media content item. Particularly, but not exclusively, the present disclosure relates to providing a single inventory to allow playback in both landscape and portrait modes on a user device.

SUMMARY

It is now common for a user to reorientate a user device when viewing media content. For example, when using a mobile device, such as a smartphone, to watch a movie, viewing the movie in landscape mode better presents the movie in a format closer to its original formant. On the other hand, portrait mode may be better suited to viewing certain parts of the movie in better detail. Moreover, portrait mode can provide a flexible and feature-rich interface for content discovery, e.g., when navigating a media guidance application or a social media application. In some cases, video content has been created and optimized differently for different use cases. Many social media apps have focused on sharing video targeted for portrait mode playback, while there is still a great amount of video created and desired for landscape viewing.

Typically, video encoding takes place after the editing for portrait or landscape viewing modes. Thus, a separate inventory is needed for each of the portrait and landscape viewing modes. Furthermore, the number of inventories can grow as different aspect ratios are required, e.g., for differently configured mobile device screens.

Systems and methods are provided herein for encoding and displaying a media content item. Such systems and methods may provide reduced operational demands of a service provider, e.g., by providing a simpler inventory when streaming content to a user device, and may provide a better viewing experience to a user, since an operational demand placed on a user device may be reduced, based on more straightforward strategies for decoding the media content item based on one or more operational parameters of the user device, such as its orientation.

According to some examples, methods and systems are provided for generating an encoded media content item having a partitioning structure comprising: multiple partitioned areas configured to, when decoded, generate display of the media content item in a first format, and a partition boundary defining one of the partitioned areas configured to, when decoded, generate display of the media content item in a second format, e.g., without decoding any other of the multiple partitioned areas.

In some examples, the partition boundary defines a region of interest of a frame of the media content item. In some examples, the position of the partition boundary is time-varying, e.g., relative to the other of the multiple partitioned areas. In some examples, the aspect ratio of the partition boundary is time-varying, e.g., relative to the other of the multiple partitioned areas. For example, the position and/or aspect ratio of the partition boundary may change from frame to frame based on the composition of successive frames of the media content item.

In some examples, the first format is a format better suited for horizontal viewing, e.g., a landscape format, and the second format is a format better suited for vertical viewing, e.g., a portrait format. For example, a landscape format is a format wherein a width of a frame is greater than a height of the frame, and a portrait format is a format wherein a width of a frame is less than a height of the frame.

In some examples, the partitioning structure is non-regular. In some examples, the partitioning structure comprises a tile structure. In some examples, the partitioning structure comprises a slice structure. In some examples, the partition boundary is cropped based on a parameter of a user device, e.g., after the media content item is decoded at a user device.

In some examples, the method further comprises: rotating the media content item; generating the partitioning structure; encoding the media content item; decoding the area of the media content item defined by the partition boundary; and rotating the decoded area of the media content item defined by the partition boundary.

In some examples, the method further comprises: determining whether a user device requires display in the first format or the second format; and in response to determining that the user device requires display in the first format, decoding and displaying the multiple partitioned areas; or in response to determining that the user device requires display in the second format, decoding and displaying the partitioned area defined by the partition boundary.

In some examples, determining whether the user device requires display in the first format or the second format comprises: determining an orientation of the user device; and determining a period for which the orientation is above a threshold orientation.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
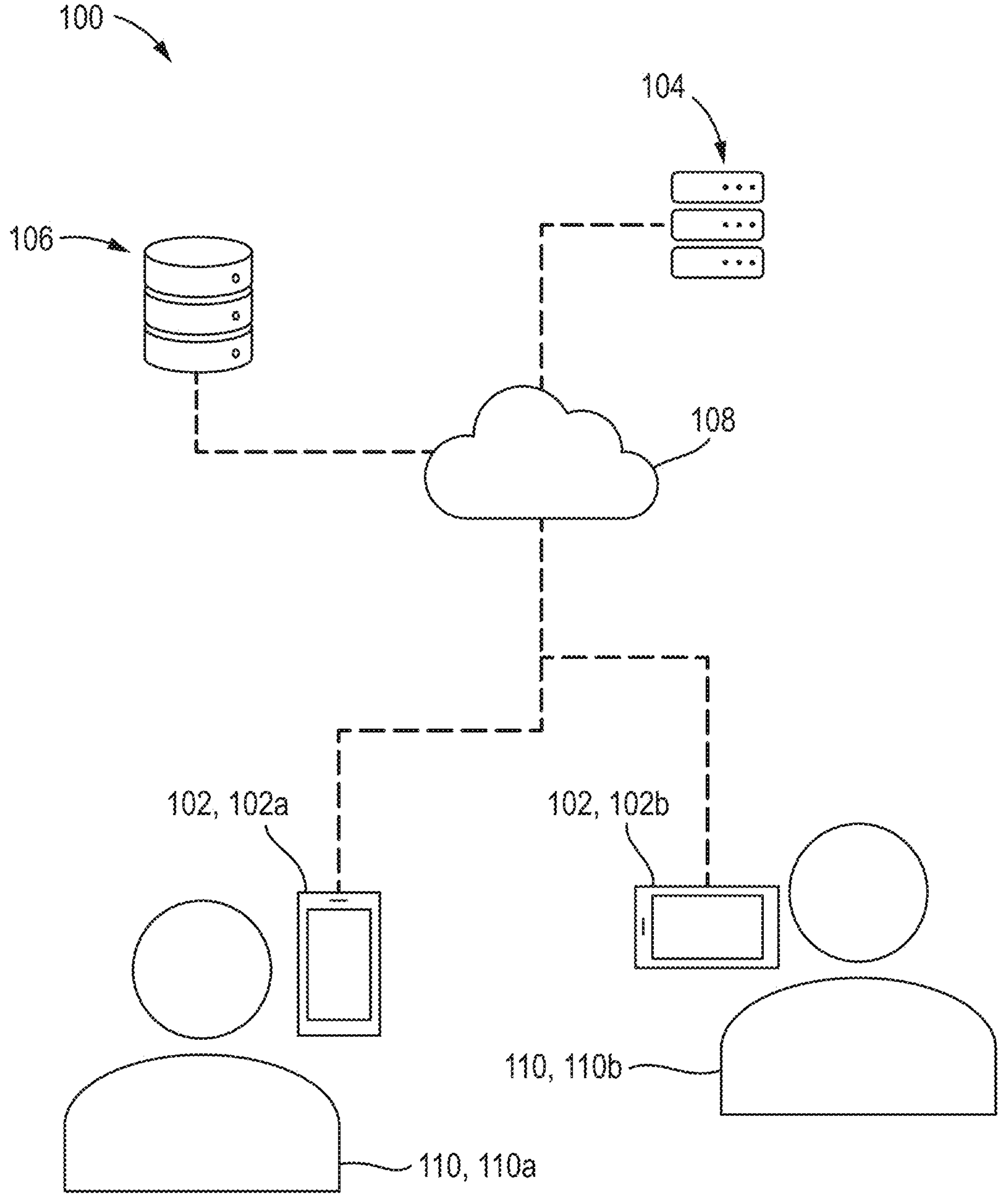
FIG. 1 illustrates overview of the system for encoding and displaying media content items, in accordance with some examples of the disclosure.

FIG. 1 illustrates an overview of a system 100 for viewing media content items over a network. In particular, the example shown in FIG. 1 illustrates user devices 102 communicatively coupled to a server 104 and a content item database 106, e.g., via network 108. In this manner, user devices 102 may receive media content on demand, e.g., from server 104. In some cases, a user 110 may reorientate the user device 102. For example, user 110*a* may orientate user device 102*a* in a portrait mode, and user 110*b* may orientate user device 102*b* in a landscape mode. Conventionally, user device 102*a* may use a version of a media content item encoded for portrait display, while user device 102*b* may use a version of a media content item encoded for landscape display. Moreover, if a user 110 reorientates a user device 102 while viewing a media content item, e.g., between landscape and portrait viewing modes, then a dual inventory is typically used, which allows the user device 102 to switch between decoding a landscape-encoded stream and a portrait-encoded stream. Additionally or alternatively, user devices 102 typically have different screen resolutions, each of which may require a different encoded version of the media content item.

One way to avoid creating an additional encode is to add cropping information into a bitstream. However, this requires the player to first decode the entire video. Thus, it is highly desirable for a bitstream to be encoded so that it is possible to decode only the required bits to enable playback of the media content item in portrait mode or landscape mode, e.g., as necessitated by the orientation of the user device 102. This will eliminate the need for either creating a separate encode for each of the portrait mode and the landscape mode, or decoding the entire video encoded for landscape and then cropping to portrait mode.

The systems and methods disclosed herein enable a single inventory to allow playback in a first format and a second format. For example, the first format may be a landscape (e.g., horizontal) format and the second format may be a portrait format (e.g., a vertical format). In some examples, each of the first and second formats may support display of a media content item in a different aspect ratio, such as 16:9 and 9:16, or 1:1 and 2:3, e.g., to suit the configuration of the user device 102. The benefit comes in twofold. The disclosed systems and methods can remove the need of dual inventory of encoded streams, which therefore reduces the storage requirements. For example, a partitioning structure, built into the encoding of the media content item can signal, e.g., automatically, the intended presentation of the streamed media content item. For example, in portrait viewing, the video decoding is applied, e.g., only, to the portions of the media content item required for portrait presentation, which significantly reduces the computational demands.

In the example shown in FIG. 1, system 100 includes at least one user device 102, such as a tablet computer, a smartphone, a smart television, or the like, configured to display or otherwise provide, e.g., aurally, media content to one or more respective users. System 100 may also include network 108 such as the Internet, configured to communicatively couple user devices 102 to one or more servers 104 and/or one or more content databases 106 from which media content, such as music, TV shows, movies and/or advertisement content, may be obtained for display on the user devices 102. User device 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of (or operated by) a service provider who provides media content for display on user device 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database of one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item. In some examples, the application provides users with access to a group watching session and/or group communication functionality. For example, the application may provide a user with an option to join a group watching session and participate in group communication with one or more other users participating in the group watching session.

Interactive media guidance applications may take various forms, depending on the content for which they provide guidance. One typical type of media guidance applications is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media content items", "media asset", "content items" and "content" should each be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
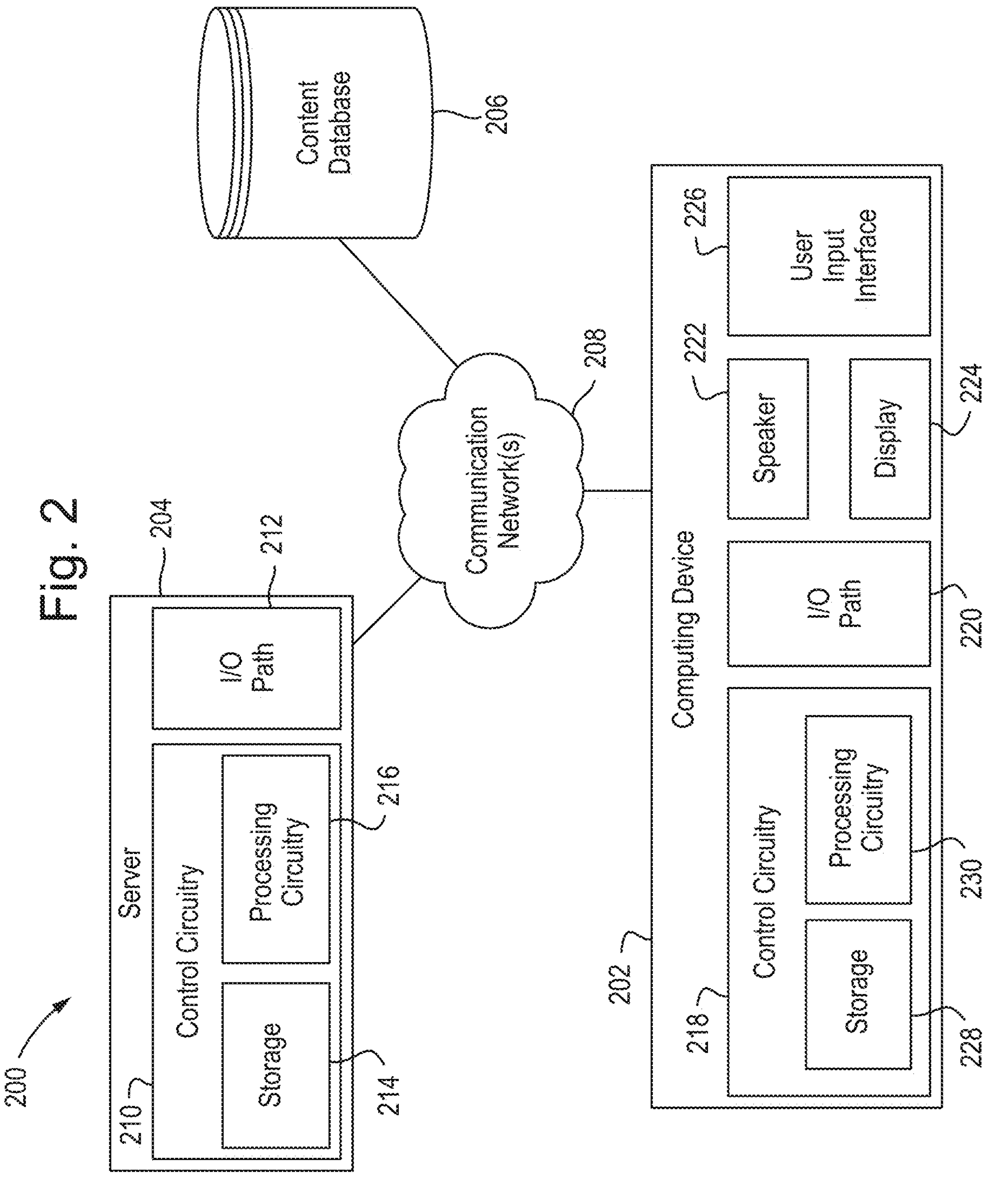
FIG. 2 is a block diagram showing components of an example system for encoding and displaying media content items, in accordance with some examples of the disclosure.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 211 and input/output (hereinafter "I/O") path 212, and control circuitry 211 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226. Control circuitry 218 includes storage 228 and processing circuitry 220. Control circuitry 211 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 211 and/or 218 may be instructed by the application to perform the functions discussed herein. In some implementations, any action performed by control circuitry 211 and/or 218 may be based on instructions received from the application. For example, the application may be implemented as software or a set of executable instructions that may be stored in storage 214 and/or 228 and executed by control circuitry 211 and/or 218. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 211) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user device may send instructions, e.g., to view an interactive media content item and/or select one or more programming options of the interactive media content item, to control circuitry 211 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212, and/or I/O path 220 may include a communication port(s) configured to transmit and/or receive (for instance to and/or from content database 206), via communication network 208, content item identifiers, content metadata, natural language queries, and/or other data. Control circuitry 211 and/or 218 may be used to send and receive commands, requests, and other suitable data using I/O paths 212 and/or 220.

Figure 3A:
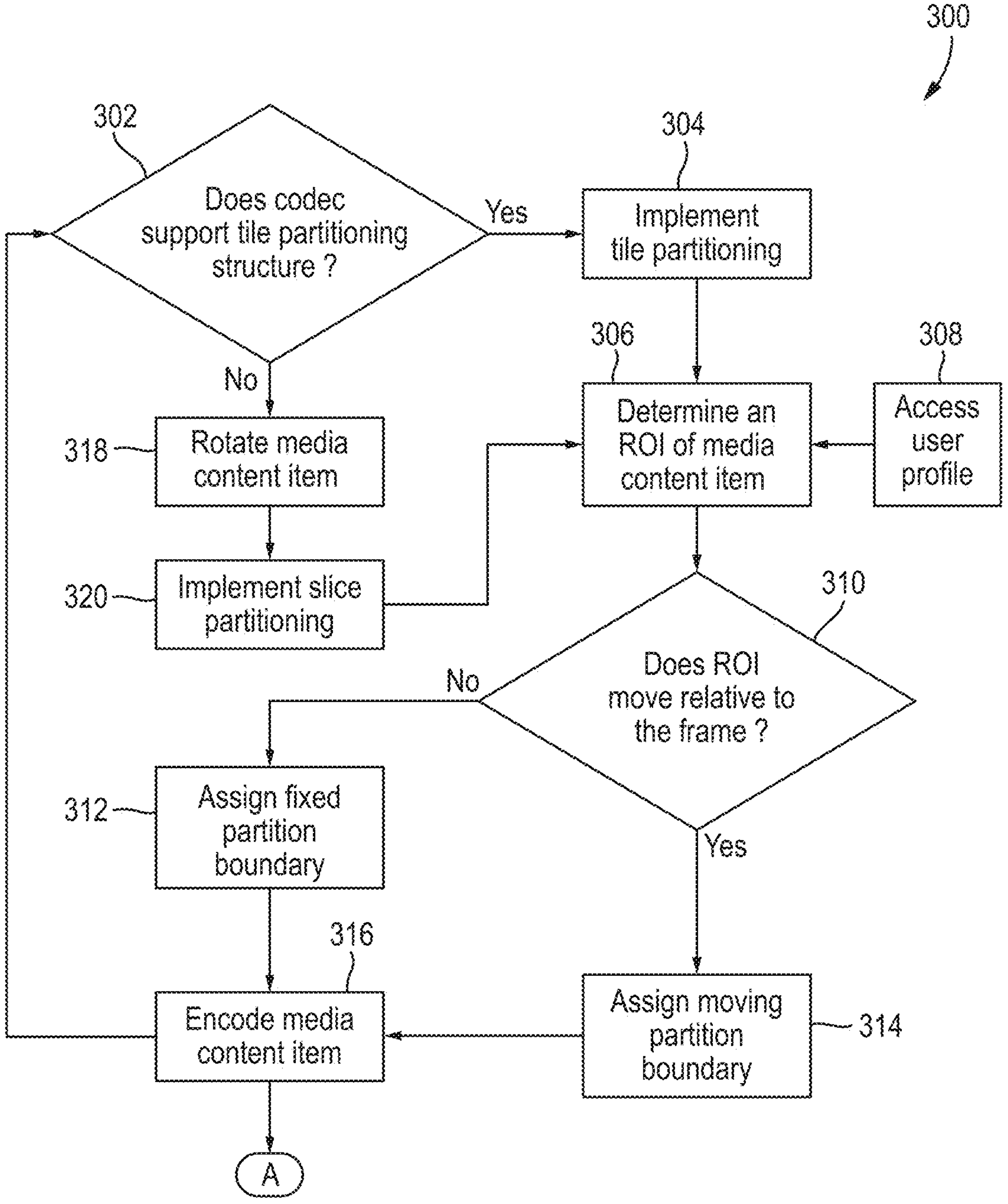
FIG. 3A is a flowchart representing a process for encoding and displaying media content items, in accordance with some examples of the disclosure.
Figure 3B:
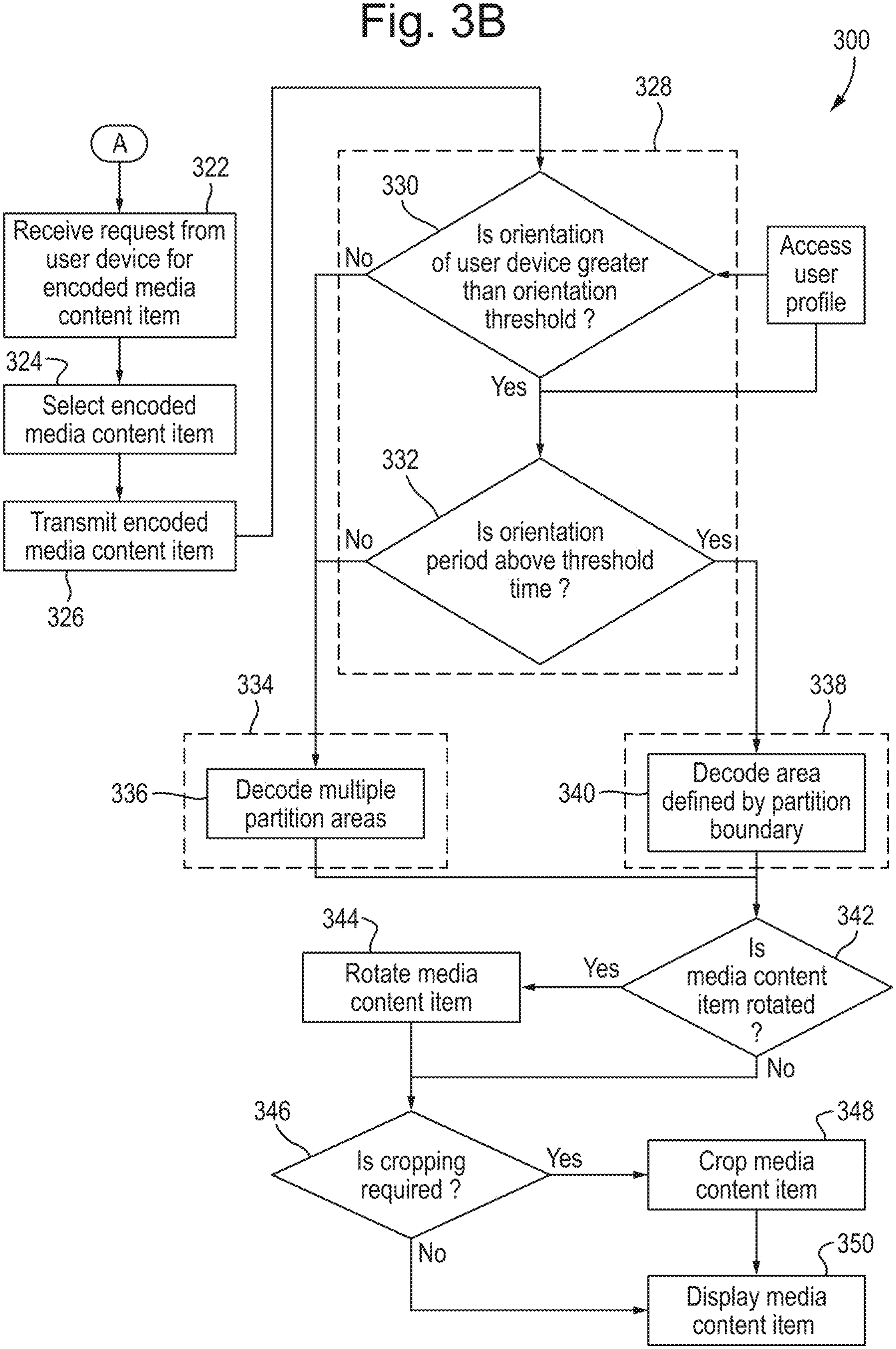
FIG. 3B is a continuation of the flowchart shown in FIG. 3A.
Figure 4A:
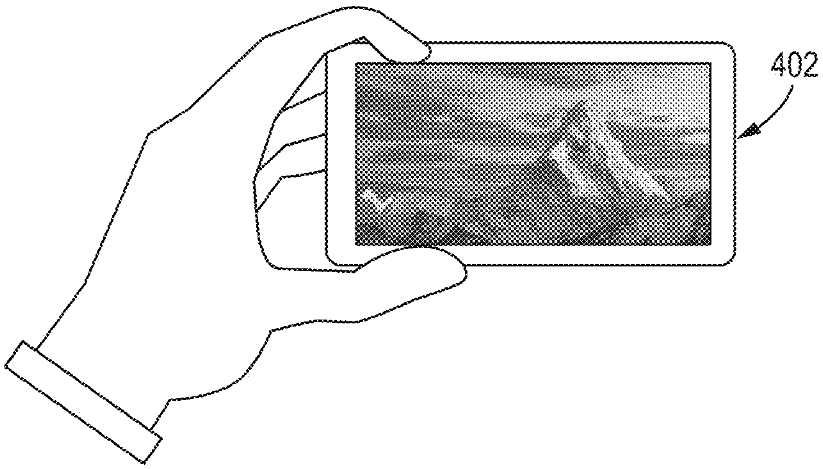
FIG. 4A illustrates a user device in a landscape orientation, in accordance with some examples of the disclosure.
Figure 4B:
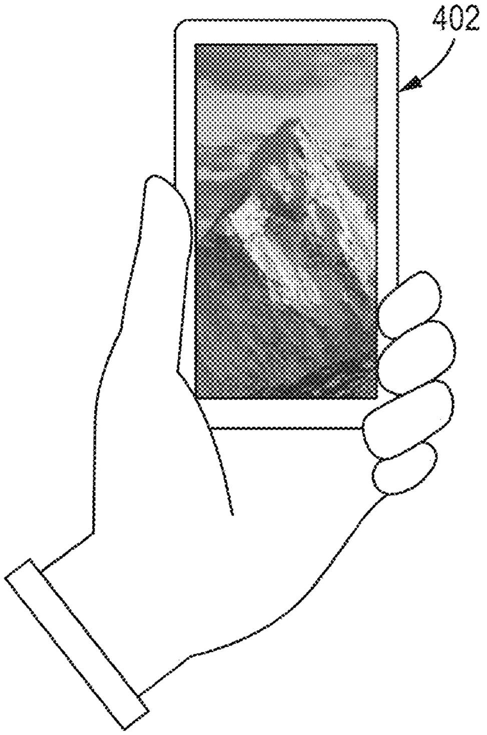
FIG. 4B illustrates a user device in a portrait orientation, in accordance with some examples of the disclosure.

FIGS. 3A and 3B show a flowchart representing an illustrative process 300 for encoding and displaying a media content item, e.g., in different formats, in accordance with some examples of the disclosure. FIGS. 4A and 4B show, respectively, a user device in a landscape viewing mode and a portrait viewing mode, in accordance with some examples of the disclosure. FIGS. 5A to 5D show encoding of media content item having a tiled partitioning structure, in accordance with some examples of the disclosure. FIGS. 6A to 6D show encoding of media content item having a sliced partitioning structure, in accordance with some examples of the disclosure. FIG. 7 shows two frames of a media content item having a moving region of interest (ROI), in accordance with some examples of the disclosure. FIGS. 8A to 8D depict reorientating a user device, in accordance with some examples of the disclosure. While the example shown in FIGS. 3 to 8D refers to the use of system 100, as shown in FIG. 1, it will be appreciated that the illustrative process shown in FIGS. 3 to 8D, may be implemented on system 100 and system 200, either alone or in combination with each other, and/or any other appropriately configured system architecture.

In particular, FIG. 3A shows a portion of process 300 for encoding a media content item.

At 302, control circuitry, e.g., control circuitry 210, determines a type of partitioning structure supported by a codec. For example, control circuitry may determine whether a codec supports a tile-based partitioning structure, a slice-based partitioning structure, or any other appropriate type of partitioning structure. In some examples, control circuitry may access a database containing information relating to one or more types of codecs to determine which type of partitioning they support. For example, database may contain information relating to codec usage (e.g., codec popularity) and associated support for various types of partitioning structures, such as H.264/AVC does not support tile-based partitioning and does support slice-based partitioning, and H.265/HEVC does support tile-based partitioning. In this manner control circuitry may determine which type of partition to implement, and may determine to implement one type of partitioning over another, such that the media content item is encoded, in the first instance, for use by one codec over another codec. When a codec supports tile-base partitioning, process 300 moves to 304. When a codec does not support tile-base partitioning, process 300 moves to 318.

Figure 5A:
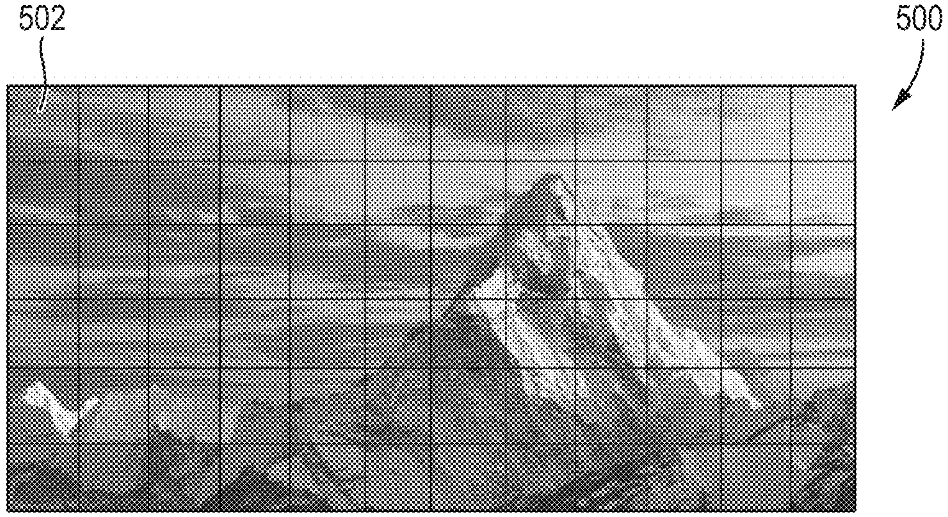
FIG. 5A depicts a partitioning structure strategy, in accordance with some examples of the disclosure.
Figure 5B:
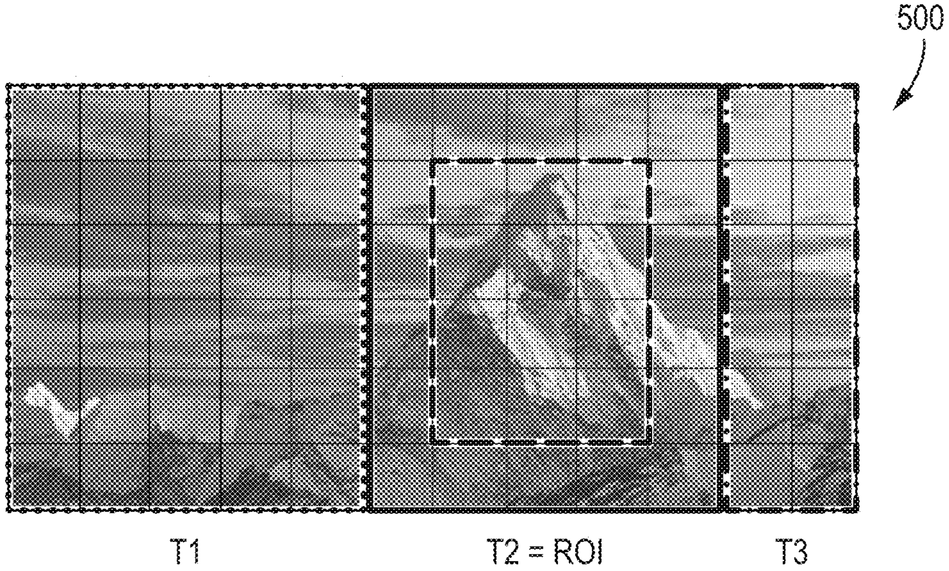
FIG. 5B depicts the partitioning structure strategy of FIG. 5A, in accordance with some examples of the disclosure.

At 304, control circuitry, e.g., control circuitry 210, implements a tile-base partitioning structure for partition the media content item. For example, control circuitry may determine that each frame of the media content item is to be divided into multiple tiles. FIGS. 5A and 5B show how tile-based partition structure may be implemented. For example, FIG. 5A shows a frame 500 of a media content item, which in this case shows a mountainous vista. However, for the sake of clarity, the present systems and method may be applied to any appropriate type of content, such as a movie, TV program, video call, webinar, lecture, etc. In FIG. 5A, frame 500 comprises multiple content units 502, arrange in a regular manner, e.g., each content unit 502 may comprise a predetermined number of macroblocks, such that each content unit 502 in frame 500 comprises the same number of pixels, for example. However, in some examples, the coding units may be of different sizes.

At 306, control circuitry, e.g., control circuitry 210, determines a ROI of frame 500. For example, control circuitry may access a user profile, at 308, to determine one or more topics of interest of a user. In this case, the user profile may be set to accept a default setting of service provider, who may denote which region of frame 500 comprises the ROI. For example, the ROI may be the main focal point of frame 500, which in this case is a mountain peak, but in other cases, the ROI may be a face of an individual in a frame or an item, e.g., product, in a frame of an advertisement. In some examples, the user profile may comprise a setting to not accept, e.g., as default, a setting of a service provider, and may, instead, choose one or more topics that they wish to be shown in the ROI. In this manner, the systems and methods herein provide for a personated encoding process, based on their user profile, or one or more other trending topics, for example.

At 310, control circuitry, e.g., control circuitry 210, determines whether the ROI moves relative to frame 500 as the media content item is played. For example, the media content item may comprise a scene that pans across the mountain range shown in FIGS. 5A to 5D. In such an example, the position and/or aspect ratio of the ROI may vary relative to playback time. However, in other examples, the ROI may remain fixed relative to the frame, such as where the media content item is a presentation or webinar showing an inset/overlaid slideshow (where the slideshow may be the ROI). When the ROI does not move or change relative to frame 500, process 300 moves to 312. When the ROI does move or change relative to frame 500, process 300 moves to 314.

Referring to FIG. 7 for more detail on determining whether the ROI moves or changes during playback of a media content item, the ROI of a frame may comprise an action occurring in the frame. For example, frames 702 and 704 of FIG. 7 comprise a person running. In some examples, control circuitry may be configured to perform one or more image processing techniques to determine, e.g., automatically, which portions of a frame contain some form of action. For example, frame 702 is at time t during the playback of the media content item, and frame 704 is at time t+n during the playback of the media content item. In frame 702, the ROI surrounds the running person, and in frame 704, the ROI surrounds the running person at offset distance D1 relative to the position of the ROI in frame 702. In this manner, the position of the ROI may be tracked relative to a frame as playback advances. As such, it is understood that the distribution of the partitioning structure may be time varying.

At 312, control circuitry, e.g., control circuitry 210, assigns a fixed partition boundary to the ROI, e.g., in response to determining that the ROI does not move or change shape as playback advances.

At 314, control circuitry, e.g., control circuitry 210, assigns a moving partition boundary to the ROI, e.g., in response to determining that the ROI does move or change shape as playback advances, in a similar manner to that shown in FIG. 7.

At 316, control circuitry, e.g., control circuitry 210, encodes each frame of the media content item with a certain partitioning structure. Referring to FIG. 5B, frame 500 has been encoded with a partitioning structure comprising three tiles T1, T2 and T3, wherein T2 comprises the ROI, i.e., the mountain peak having the assigned partition boundary. In the example shown in FIG. 5B, each of the tiles extends the full height of the frame. However, in some examples, one or more of the tiles may extend partially along the height of the frame, e.g., see dashed line on FIG. 5B representing an alternate ROI. Irrespective of the exact configuration of the tiles, the boundary of each tile and the partition boundary, which defines the ROI, lies coincident with one or more coding unit boundaries. In some examples, control circuitry may embed supplemental enhancement information (SEI) as additional data inserted into a bitstream to convey extra information about an encoded frame. For example, the SEI may comprise an instruction for a user device 102 to switch from decoding all of the tiles to, e.g., only, the tile defined by the partition boundary. Such switching which tiles are decoded may occur in response to one or more actions performed with the user device 102, such as changing the orientation of the user device 102 and/or one or more settings on the user device 102.

Referring back to 302, when control circuitry determines that a codec does not support a tile-based partitioning structure, process 300 moves to 318. It is to be understood that, where technically possible, the features of the disclosed systems and method relating to tile-based methodology are to be used, mutatis mutandis, in relation to slice-based methodology. However, a complication arises when tiles are not supported. For example, typically, a slice-based partitioning structure consists of a group of continuous content units in raster scan order. However, applying the above-described partition boundary, which defines the ROI, would result in a partitioning that breaks the statistical correlation of spatially neighboring sliced content units. To account for this and enable codecs supporting slice-based partitioning to be used to equal advantage, at 318, control circuitry, e.g., control circuitry 210, rotates the media content item, e.g., rotates a frame of the media content item prior to implementing a partitioning structure and encoding the media content item.

Figure 6A:
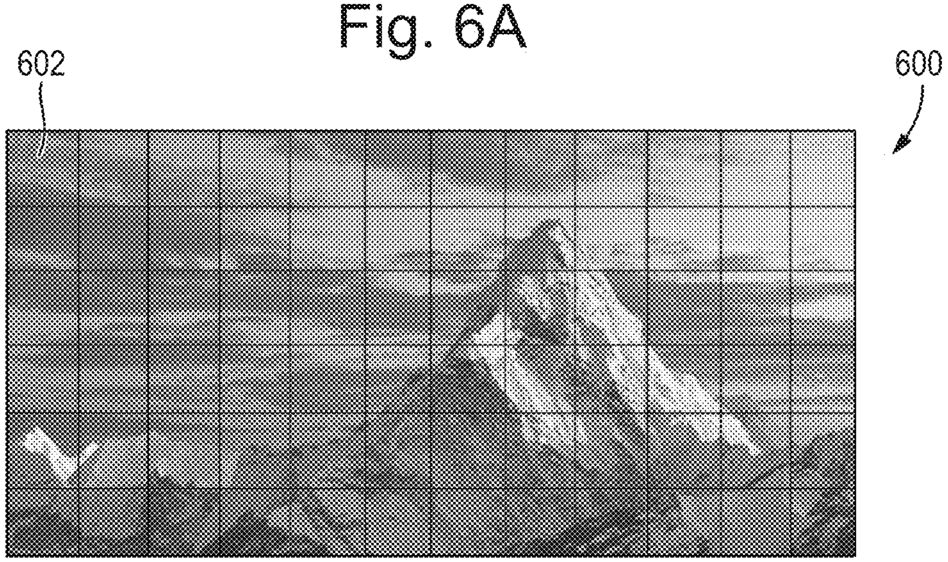
FIG. 6A depicts a partitioning structure strategy, in accordance with some examples of the disclosure.
Figure 6B:
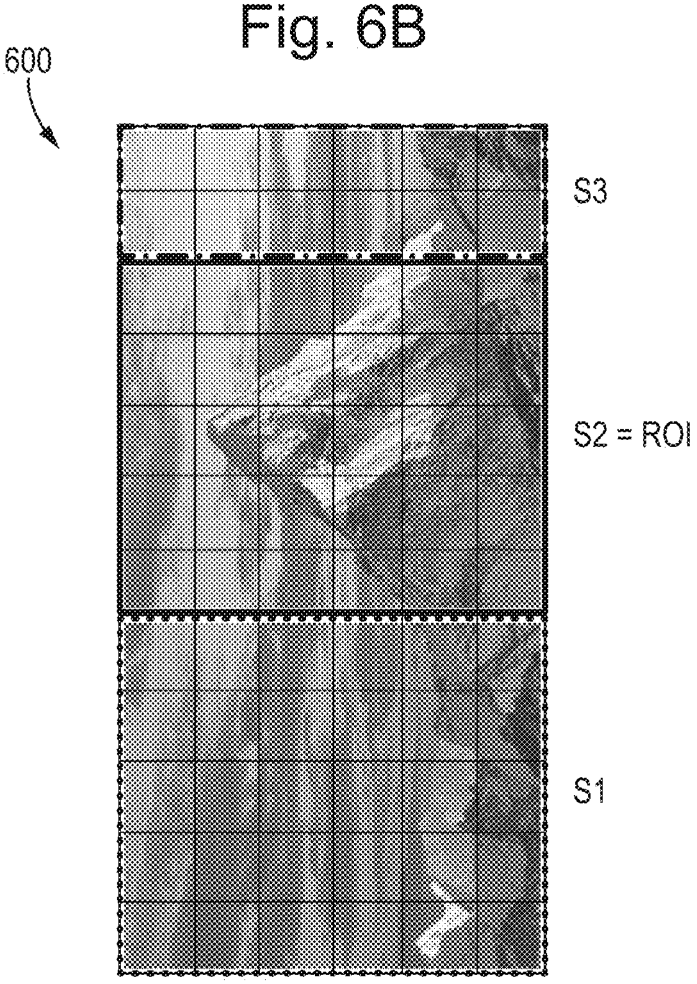
FIG. 6B depicts the partitioning structure strategy of FIG. 6A, in accordance with some examples of the disclosure.
Figure 7:
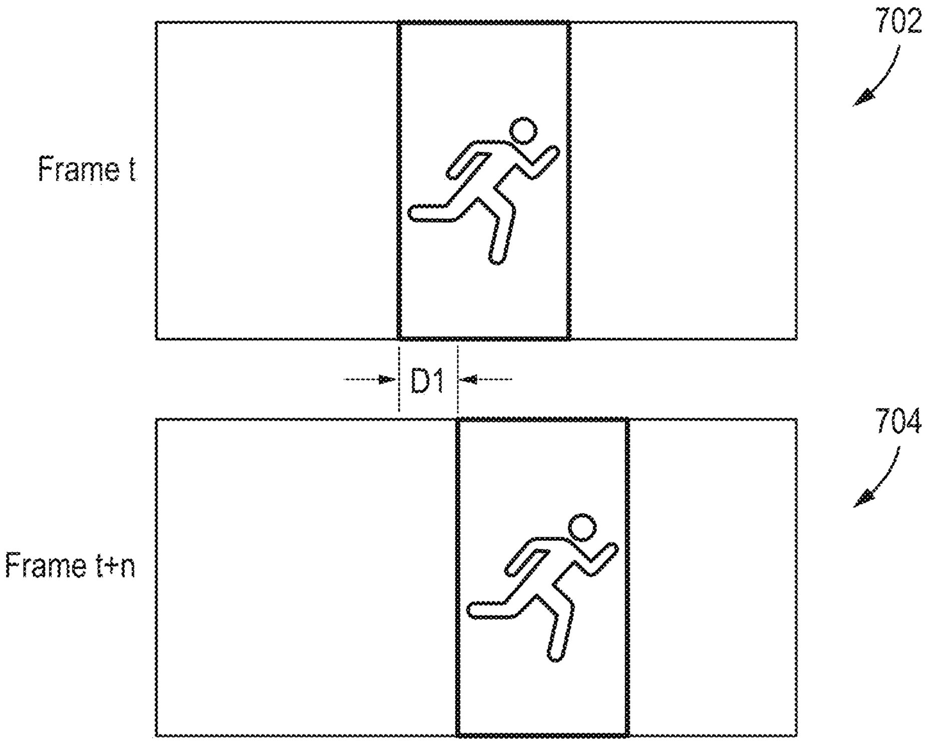
FIG. 7 depicts moving partition boundary, in accordance with some examples of the disclosure.

Referring to FIG. 6A, frame 600 comprises multiple content units 602 arranged in a regular manner, e.g., each coding unit 602 may comprise a predetermined number of macroblocks, such that each content unit 602 in frame 600 comprises the same number of pixels, for example. However, in some examples, the coding units may be of different sizes. In other words, frame 600 is analogous to frame 500, since it represents the same frame of the media content item. However, since slice-based partitioning is to be implemented, frame 600 is rotated, e.g., as shown in FIG. 6B, such that each slice may extend across the full width of the frame after rotation, which allows the slices to still be read and decoded in raster scan order.

At 320, control circuitry, e.g., control circuitry 210, implements a slice-base partitioning structure for partition the media content item. For example, control circuitry may determine that each frame of the media content item is to be divided into multiple slices. FIGS. 6A and 6B show how a slice-based partition structure may be implemented. For example, FIG. 6A shows a frame 600 of a media content item, which in this case shows a rotated mountainous vista. Process 300 then continues in a similar manner for tile-base processing. As a result, at 316, control circuitry, e.g., control circuitry 210, encodes each frame of the media content item with a certain partitioning structure. Referring to FIG. 6B, frame 600 has been encoded with a partitioning structure comprising three slices S1, S2 and S3, wherein S2 comprises the ROI, i.e., the mountain peak having the assigned partition boundary. In the example shown in FIG. 6B, each of the slices extends the full width of the frame. However, as discussed above, implementation of slice-based partitioning results in each frame of the media content item being rotated, e.g., by 90 degrees. As such, an SEI embedded in the bitstream may contain information instructing the user device 102 to decode and rotate the media content item prior to displaying it, to return it to its intended orientation.

Following the encoding of the media content item, in whichever codec/partitioning structure combination, process 300 may move back to 302, to repeat the process for other codec/partitioning structure combinations, e.g., to ensure that an encoded media content item can be delivered for use with any appropriate user device 102. For example, process 300, as shown in FIG. 3A, may be repeated, as necessary, to cover common codecs and common user device configurations.

FIG. 3B shows a portion of process 300 for displaying a media content item encoded using the process shown in FIG. 3A. For example, following 316, process 300 may move to 322 (see Arrow A).

At 322, control circuitry, e.g., control circuitry 210, receives a request from user device 102 for an encoded media content item. For example, the request may contain information relating to which codec(s) are supported by user device 102.

At 324, control circuitry, e.g., control circuitry 210, selects an encoded media content item corresponding to the request from user device 102. For example, user device 102 may request a media content item in a certain quality for decoding by a certain codec, e.g., H.264/AVC.

At 326, control circuitry, e.g., control circuitry 210, transmits the requested encoded media content item to user device 102. Importantly, the encode media content item is transmitted in a single inventory with SEI pertaining to how to decode the media content item based on its partitioning structure. For example, the SEI may contain instructions on how to decode the tile/slices, e.g., which tile(s)/slice(s) to decode based on whether user device 102 requires display in a first format or a second format. In some examples, the first and second format may be related to an operational parameter of the user device 102, such as its orientation. For example, the first format may be a landscape display format and the second formant may be a portrait display format.

At 328, control circuitry, e.g., control circuitry 218, determines whether user device 102 requires display in the first format or the second format. In the example shown in FIG. 3B, 328 comprises 330 and 332. In some examples, a user profile may contain one or more settings relating to when to switch between display in the first format and the second format.

Figure 8A:
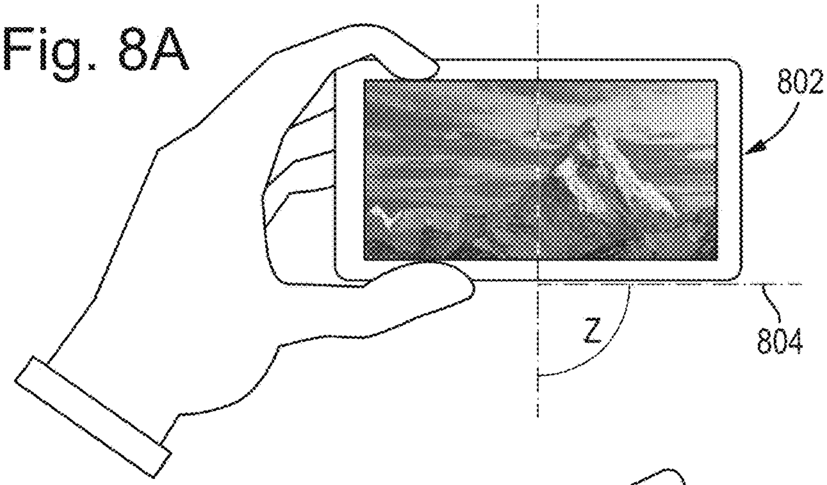
FIG. 8A illustrates a user device in one orientation, in accordance with some examples of the disclosure.
Figure 8B:
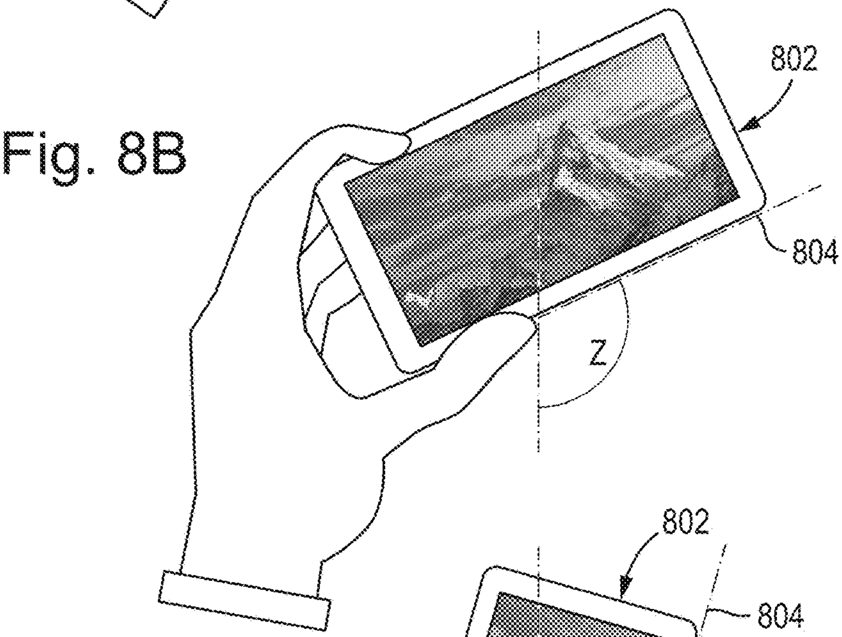
FIG. 8B illustrates a user device in another orientation, in accordance with some examples of the disclosure.
Figure 8C:
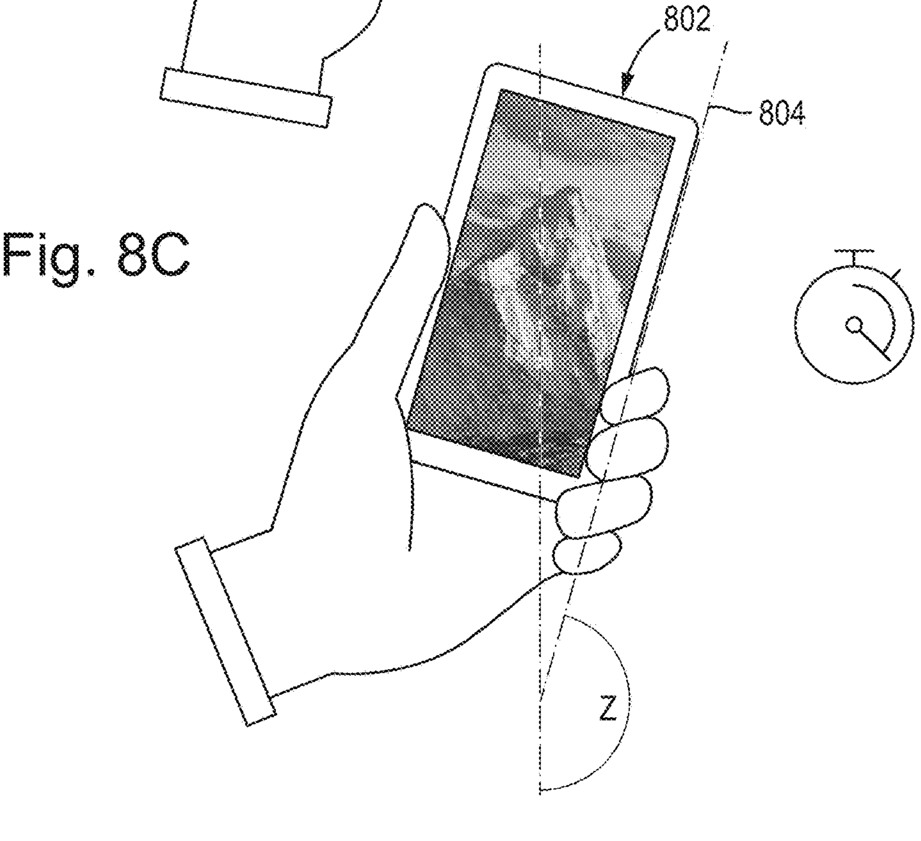
FIG. 8C illustrates a user device in another orientation, in accordance with some examples of the disclosure.

At 330, control circuitry, e.g., control circuitry 218, determines whether the orientation of user device 102 is greater than orientation threshold. Referring to FIGS. 8A to 8C, user device 802 is rotated anticlockwise, such that an angle Z between edge 804 of user device 802 and a vertical reference increases. In some examples, control circuitry may determine the angle of the user device 802 based on the output of one or more sensors of user device 802, such as an onboard accelerometer, as is typically installed in modern devices. Moving from the orientation shown in FIG. 8A to that shown in FIG. 8B, angle Z increases from about 90 degrees to about 110 degrees. In FIG. 8B, angle Z is not greater than a predetermined threshold angle of orientation. As such, process 300 moves to 334.

At 334, control circuitry, e.g., control circuitry 218, determines to display the media content item in the first format. In the example shown in FIG. 3B, 334 comprises 336.

At 336, control circuitry, e.g., control circuitry 218, access the SEI embedded in the bitrate stream. The SEI contains instructions on which tiles/slices to decode for displaying the media content item in the first format, e.g., in a landscape format. When a tile-based partitioning structure has been implemented, decoding of tiles T1, T2 and T3 would result in entire frame 500 being decoded for display. When a slice-based partitioning structure has been implemented, decoding of slices S1, S2 and S3 would result in entire frame 600 being decoded for display.

Returning back to FIGS. 8A to 8C, angle Z is further increased between the orientation shown in FIG. 8B and that shown in FIG. 8C, from about 110 degrees to 160 degrees. In FIG. 8C, angle Z is greater than the predetermined threshold angle of orientation. As such, process 300 moves to 332.

At 332 control circuitry, e.g., control circuitry 218, determines whether the orientation of user device 102 has been held at an orientation for greater than a threshold period. For example, the threshold period may be set to an amount of time, e.g., 2 seconds, to ensure that the format of the display of the media content item does not switch inadvertently, such as when a user is jolted or slips. Thus, when user device 802 is held at an angle above the threshold angle, but not for longer than the threshold period, process moves to 334 as described above. However, when user device 802 is held at an angle above the threshold angle for longer than the threshold period, process moves to 338.

At 338, control circuitry, e.g., control circuitry 218, determines to display the media content item in the second format. In the example shown in FIG. 3B, 338 comprises 340.

Figure 5C:
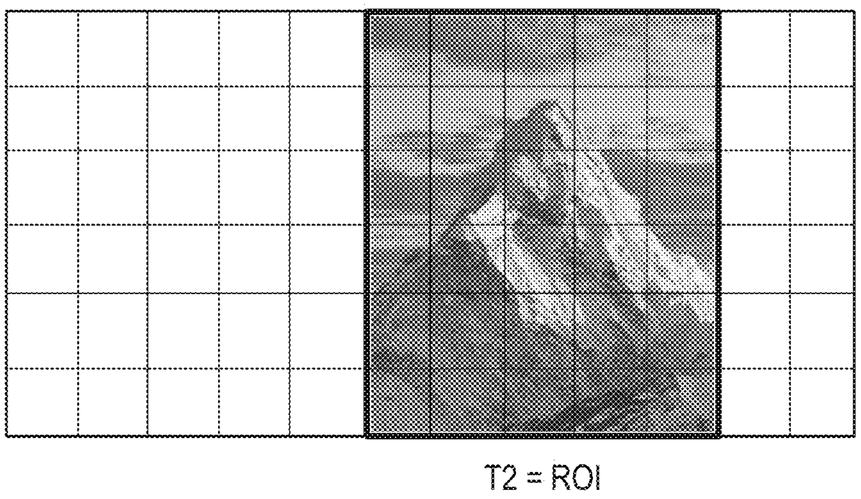
FIG. 5C depicts the partitioning structure strategy of FIGS. 5A and 5B, in accordance with some examples of the disclosure.
Figure 6C:
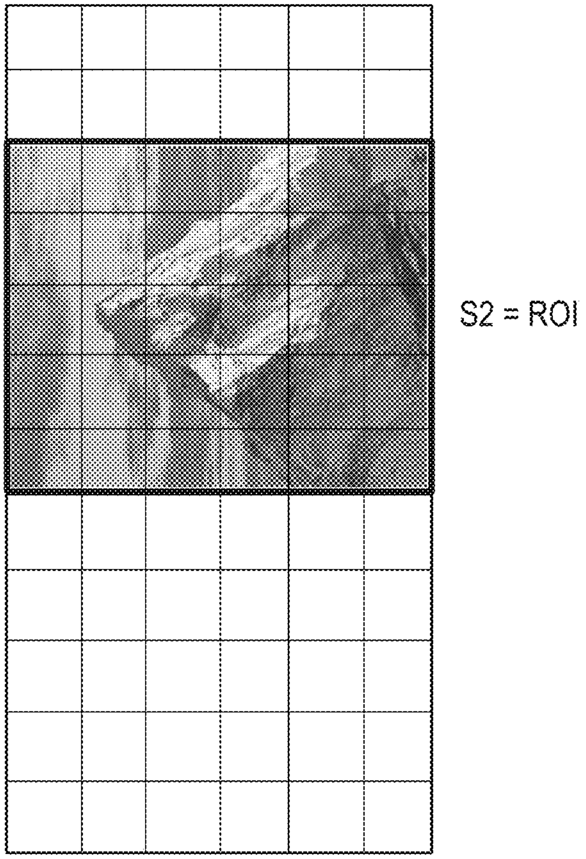
FIG. 6C depicts the partitioning structure strategy of FIGS. 6A and 6B, in accordance with some examples of the disclosure.

At 340, control circuitry, e.g., control circuitry 218, access the SEI embedded in the bitrate stream. The SEI contains instructions on which tiles/slices to decode for displaying the media content item in the second format, e.g., in a portrait format. In particular, under these conditions, control circuitry is instructed to decode, e.g., only decode, the tile/slice defined by the partition boundary. When a tile-based partitioning structure has been implemented, decoding of tile T2 would result in the ROI of frame 500 being decoded for display, e.g., as shown in FIG. 5C. When a slice-based partitioning structure has been implemented, decoding of slice S2 would result in the ROI of frame 600 being decoded for display, e.g., as shown in FIG. 6C.

At 342, control circuitry, e.g., control circuitry 218, determines whether the decoded media content item needs to be rotated, e.g., to account for encoding for slice-based partitioning structures. In some examples, control circuitry may access the SEI to look for a rotation instruction. In other examples, control circuitry may perform one or more appropriate image processing techniques to determine whether the decoded frame is likely to be in a rotated orientation. When the decoded media content item is rotated, process 300 moves to 344. When the decoded media content item is rotated, process 300 moves to 346.

At 344, control circuitry, e.g., control circuitry 218, performs a rotation operation on the decoded media content item. For example, control circuitry may rotate the entire frame of the media content item, or just the ROI defined by the partition boundary, e.g., depending on the outcome of 334 and 338. In the example shown in FIG. 6D, the decoded ROI (i.e., S2 shown in FIG. 6C) is rotated to is intended orientation. For the sake of completeness, rotation after decoding is not required for the tile-based partitioning structure shown in FIGS. 5A to 5D.

At 346, control circuitry, e.g., control circuitry 218, determines whether the decoded media content item requires cropping, e.g., such that the decoded media content item better fits the screen of the user device 102 in either landscape or portrait display mode. For example, cropping may be required when the exact version of the encoded media content item was unavailable at 322. For example, control circuitry of the user device 102 may have requested an encoded version of the media content item having a first format having an aspect ratio of 16:9, and second format having an aspect ratio of 9:16. However, server 104, may have supplied a slightly different version of the media content item having a first format having the aspect ratio of 16:9, but a second format having an aspect ratio of 1:1. As such, when cropping is required, process 300 moves to 348, and when cropping is not required, process 300 moves to 350.

Figure 5D:
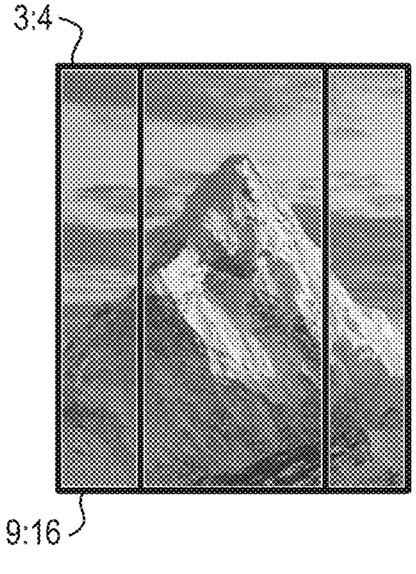
FIG. 5D depicts the partitioning structure strategy of FIG. 5A to 5C, in accordance with some examples of the disclosure.
Figure 6D:
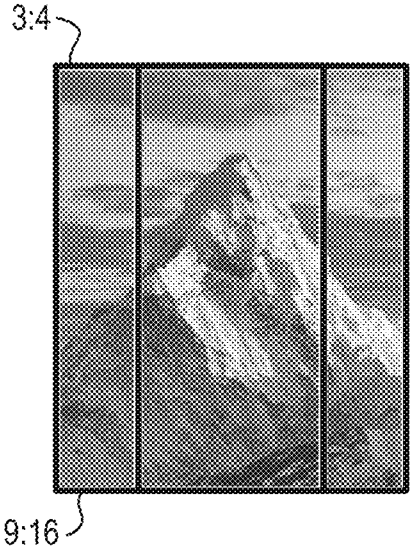
FIG. 6D depicts the partitioning structure strategy of FIG. 6A to 6C, in accordance with some examples of the disclosure.

At 348, control circuitry, e.g., control circuitry 218, crops the media content item to the required format. For example, FIGS. 5D and 6D illustrate cropping the ROI from an aspect ratio of 3:4 to an aspect ratio of 9:16, e.g., to better suit the display of the media content item in a portrait viewing mode.

At 350, control circuitry, e.g., control circuitry 218, causes the media content item to be displayed in the first or second format, e.g., based on the orientation of the user device.

The actions or descriptions of FIGS. 3A and 3B may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

encoding, using control circuitry, a media content item, wherein the encoding process comprises:

receiving a user selection, from a user device configured to access the media content item, of at least one topic of interest;

based at least in part on the at least one topic of interest, identifying a region of interest presented among a plurality of frames of the media content item;

generating an encoded media item having a partitioning structure comprising:

multiple partitioned areas configured to, when decoded, generate display of the media content item in a first format; and a partition boundary defining one of the partitioned areas configured to, when decoded, generate display of the media content item in a second format, wherein the partition boundary within each respective frame encloses the region of interest;

determining whether the user device requires display in the first format or the second format, wherein the determining comprises:

determining an orientation of the user device; and determining a period for which the orientation is above a threshold orientation, wherein determining that the user device requires display of the media content item in the first format causes the user device to decode and generate for display the multiple partitioned areas, and wherein determining that the user device requires the display of the media content item in the second format causes the user device to decode and generate for display the partitioned area defined by the partition boundary.

2. The method according to claim 1, wherein the position of the partition boundary is time-varying.

3. The method according to claim 1, wherein the aspect ratio of the partition boundary is time-varying.

4. The method according to claim 1, wherein the first format is a landscape format and the second format is a portrait format.

5. The method according to claim 1, wherein the partitioning structure is non-regular.

6. The method according to claim 1, wherein the partitioning structure comprises a tile-based structure or a slice-based structure.

7. The method of claim 1, wherein the partition boundary is cropped based on a parameter of the user device.

8. The method of claim 1, wherein the method further comprises:

rotating the media content item;

generating the partitioning structure;

encoding the media content item;

decoding the area of the media content item defined by the partition boundary; and rotating the decoded area of the media content item defined by the partition boundary.

9. A system comprising control circuitry configured to:

encode a media content item, wherein the control circuitry is configured to encode the media content item by:

receiving a user selection, from a user device configured to access the media content item, of at least one topic of interest;

based at least in part on the at least one topic of interest, identifying a region of interest presented among a plurality of frames of the media content item;

generating an encoded media item having a partitioning structure comprising:

multiple partitioned areas configured to, when decoded, generate display of the media content item in a first format; and a partition boundary defining one of the partitioned areas configured to, when decoded, generate display of the media content item in a second format, wherein the partition boundary within each respective frame encloses the region of interest;

determine whether the user device requires display in the first format or the second format, wherein the control circuitry is configured to determine whether the user device requires display in the first format or the second format by:

determining an orientation of the user device; and determining a period for which the orientation is above a threshold orientation, wherein the control circuitry determining that the user device requires display of the media content item in the first format causes the user device to decode and generate for display the multiple partitioned areas, and wherein the control circuitry determining that the user device requires the display of the media content item in the second format causes the user device to decode and generate for display the partitioned area defined by the partition boundary.

10. The system according to claim 9, wherein the position of the partition boundary is time-varying.

11. The system according to claim 9, wherein the aspect ratio of the partition boundary is time-varying.

12. The system according to claim 9, wherein the first format is a landscape format and the second format is a portrait format.

13. The system according to claim 9, wherein the partitioning structure is non-regular.

14. The system according to claim 9, wherein the partitioning structure comprises a tile-based structure or a slice-based structure.

15. The system according to claim 9, wherein the partition boundary is cropped based on a parameter of the user device.

16. The system according to claim 9, wherein the control circuitry is further configured to:

rotate the media content item;

generate the partitioning structure;

encode the media content item;

decode the area of the media content item defined by the partition boundary; and rotate the decoded area of the media content item defined by the partition boundary.

* * * * *